United States Patent [19]

Finney

[11] Patent Number: 4,971,452

[45] Date of Patent: Nov. 20, 1990

[54] RTD ASSEMBLY

[76] Inventor: Philip F. Finney, 425 E. Washington, Villa Park, Ill. 60181

[21] Appl. No.: 481,693

[22] Filed: Feb. 20, 1990

Related U.S. Application Data

[63] Continuation of Ser. No. 325,082, Mar. 17, 1989, abandoned, which is a continuation of Ser. No. 152,806, Feb. 5, 1988, abandoned.

[51] Int. Cl.$^5$ .......................... G01K 1/12; G01K 7/16
[52] U.S. Cl. ..................... 374/208; 374/185; 374/147; 338/28
[58] Field of Search ............... 374/183, 185, 147, 208; 338/22 R, 28, 30

[56] References Cited

U.S. PATENT DOCUMENTS

| | | | |
|---|---|---|---|
| 1,140,701 | 5/1915 | Mitchell | 374/208 |
| 3,143,439 | 8/1964 | Hansen | 374/208 |
| 3,412,359 | 11/1968 | Schwyn et al. | 374/185 |
| 3,434,207 | 3/1969 | Frachon | 338/28 |
| 3,754,201 | 8/1973 | Adams | 374/185 |
| 3,874,239 | 4/1975 | Finney | 374/147 |
| 3,901,080 | 8/1975 | Hilborn | 374/147 |
| 3,907,606 | 9/1975 | Chang | 374/208 |
| 4,321,827 | 3/1982 | Anderson | 374/183 |
| 4,575,705 | 3/1986 | Gotcher | 374/183 |
| 4,590,669 | 5/1986 | Imamura | 374/208 |

FOREIGN PATENT DOCUMENTS

| | | | |
|---|---|---|---|
| 0296229 | 12/1986 | Japan | 374/208 |
| 0051284 | 6/1966 | Poland | 374/183 |
| 0402759 | 10/1973 | U.S.S.R. | 374/147 |
| 0570796 | 8/1977 | U.S.S.R. | 374/183 |
| 1040351 | 9/1983 | U.S.S.R. | 374/147 |
| 2062860 | 5/1981 | United Kingdom | 374/147 |

Primary Examiner—Thomas B. Will
Attorney, Agent, or Firm—Edmond T. Patnaude

[57] ABSTRACT

An RTD assembly is welded directly to the heat receiving surface of a heat exchanger and shields the resistance element from the combustion gasses and thermally isolates the resistance element from the sheath of a sheathed cable which electrically connects the RTD to remotely located associated circuitry. The resistance element is maintained in direct contact with the heat receiving surface of the exchanger to provide an accurate measurement of the temperature of that surface.

4 Claims, 4 Drawing Sheets

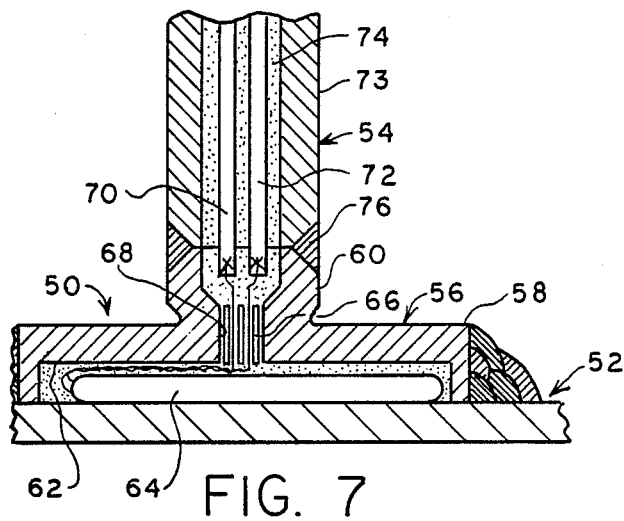
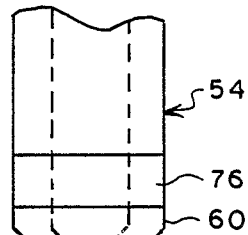
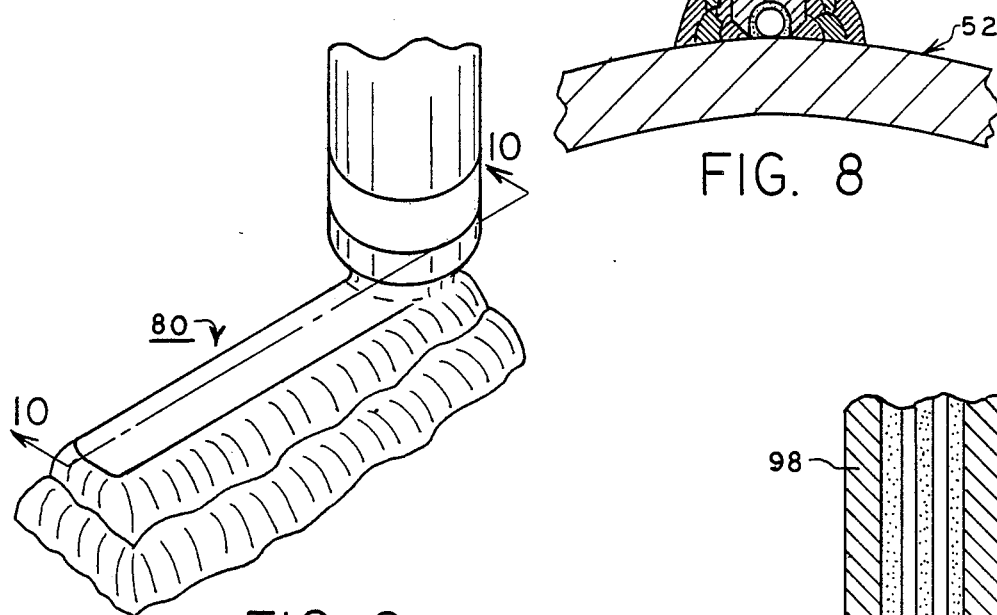
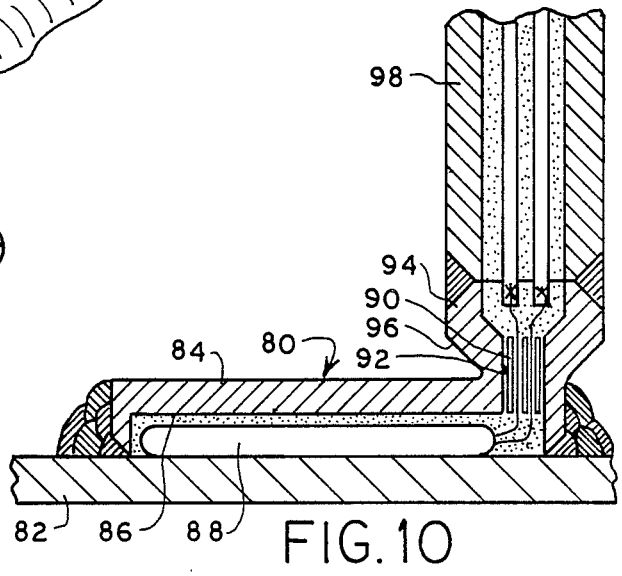
FIG. 7
FIG. 8
FIG. 9
FIG. 10

# RTD ASSEMBLY

This application is a continuation of application Ser. No. 325,082, filed Mar. 17, 1989, which is a continuation of application Ser. No. 152,806, filed Feb. 5, 1988, both now abandoned.

The present invention relates to resistance temperature detectors which are suitable for monitoring the surface temperature of heat exchangers, and it also relates to a method of making resistance temperature detectors and to a method of installing such devices on the high temperature surfaces of fired heat exchangers.

BACKGROUND OF THE INVENTION

Heat exchanger surfaces are most often thermally energized by a fuel fired means opposite the surface which is contacted by the fluid to which the heat is to be transferred. One example of such an exchanger is a tube which is externally energized and through which the fluid to be heated is passed. Another example is a diaphragm or wall having one surface to which thermal energy is imparted and an opposite surface which is contacted by the liquid or gas to be heated.

In many processes where thermal energy is used, it is desirable to monitor the temperature of the surface to which the thermal energy is applied. However, the surface which receives the thermal energy is also the surface which is exposed to the condition which is most hostile to the exchanger material. The purpose of monitoring this surface is to provide an accurate signal that is representative of the temperature thereof so that maximum process conversion can take place without overheating the exchanger material and thereby degrading the exchanger. It will thus be understood that it is important to maintain a constant thermal energy input to the exchanger where the highest conversion rates are obtained without exceeding the limits of the exchanger material, and this condition can only be provided using temperature sensors having the highest accuracy and reliability.

In the past the temperature of heat exchanger surfaces were ordinarily monitored by means of thermocouples. However, the use of thermocouples has necessitated the use of expensive signal converting equipment and reference junctions as well as special alloy leads which connect the thermocouple to the other parts of the system.

Resistance temperature detectors, commonly called RTDs, have been used for making accurate temperature measurements. They utilize a resistance element whose resistance changes with the ambient temperature in a precise and known manner. The resistance temperature detector may be connected in a bridge circuit which drives a display calibrated to show the temperature of the resistance element. However, the useful life of an RTD is shortened if the resistance element is subjected to extremely high temperatures such as the ambient temperature on the high temperature side of a fired heat exchanger where temperatures in excess of 1,800 degrees Fahrenheit are commonplace. Also, it is extremely important to isolate the resistance element from direct contact with the products of combustion which would otherwise alter the resistance stability of the resistance element and thereby adversely affect the accuracy of the RTD system.

SUMMARY OF THE INVENTION

Briefly, there is provided in accordance with the present invention an RTD assembly which is welded directly to the heat receiving surface of a heat exchanger and which shields the resistance element from the combustion gases and thermally isolates the resistance element from the sheath of a sheathed cable which electrically connects the RTD to remotely located associated circuitry. The resistance element is maintained in direct contact with the heat receiving surface of the exchanger to provide an accurate measurement of the temperature of that surface. The use of an RTD sensor eliminates the need for expensive lead wires and the associated instrumentation which have heretofor been required with thermocouple sensors.

GENERAL DESCRIPTION OF THE DRAWINGS

The present invention will be better understood by a reading of the following detailed description taken in connection with the accompanying drawing wherein:

FIG. 7 is a cross-sectional view taken along the line 7—7 of FIG. 6;

FIG. 8 is a cross-sectional view taken along the line 8—8 of FIG. 6;

FIG. 9 is a perspective view of still another embodiment of the present invention;

FIG. 10 is a cross-sectional view taken along the line 10—10 of FIG. 9;

DETAILED DESCRIPTION OF A PREFERRED EMBODIMENT

Figure 1:
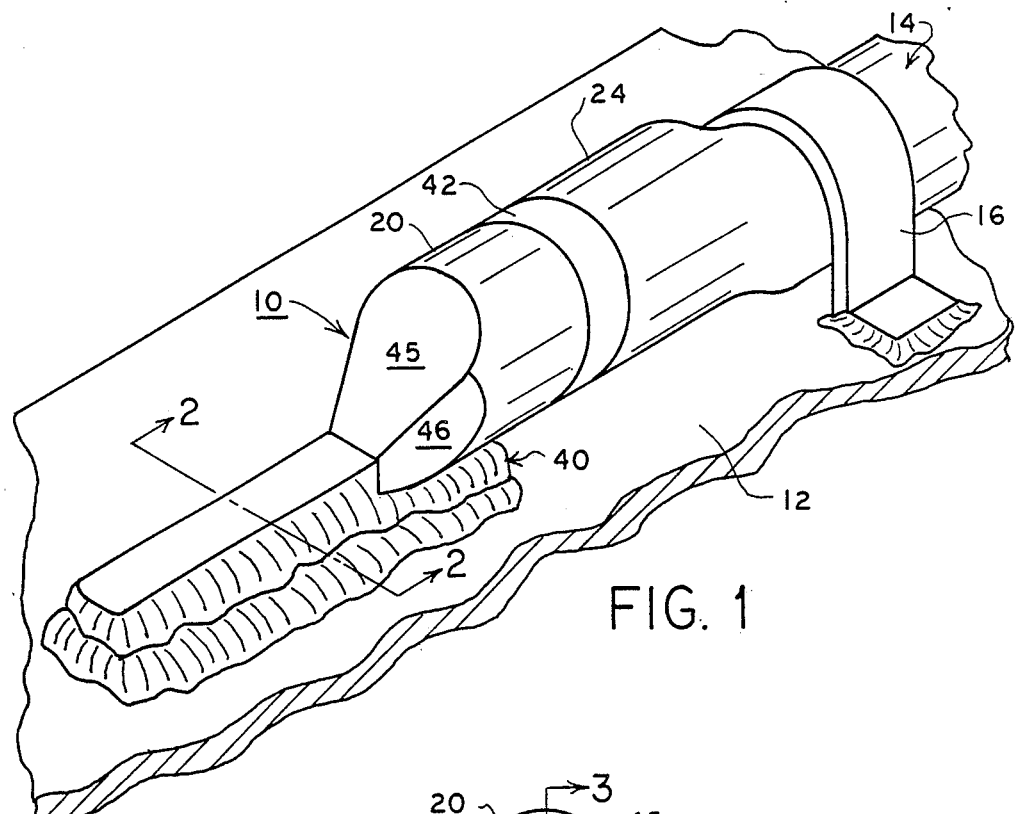
FIG. 1 is a perspective view of an RTD assembly mounted to the surface of a heat exchanger for monitoring the temperature of the heat exchanger.

Referring to FIG. 1, there is shown a resistance temperature detector assembly 10 which is welded to the external surface of a heat exchanger 12. The heat exchanger 12 is in the form of a metal tube to the outer surface of which hot combustion gases are applied and along the inner surface of which a fluid, such as a liquid or gas, is passed to be heated by the hot exchanger 12. The assembly 10 is welded directly to the external surface of the exchanger 12, and a sheathed electric cable 14 which is connected at its forward end as shown in FIG. 1 to the rearward end of the assembly 10, is mounted to the exchanger 12 by means of a metal strap 16 which is welded at its ends to the exchanger.

Figure 5:
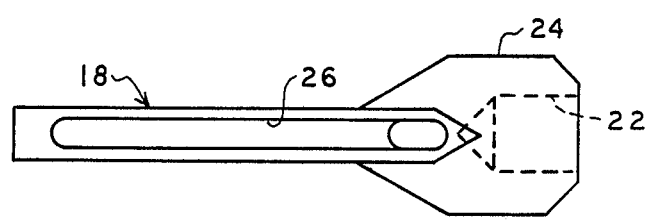
FIG. 5 is a bottom view of the body element shown in FIG. 4.

The assembly 10 comprises a metal body member 18 having a cylindrical end 20 which is provided with a cylindrical hole 22 which in the completed assembly is aligned with the outer metal sheath 24 of the sheathed cable 14. The body 18 includes an elongate recess 26 at the bottom, which can best be seen in FIGS. 2, 3 and 5, for receiving a resistance element 28 of a suitable resistance temperature detector. The resistance element 28 may be of conventional construction such as the wire wound type or thin film type. A pair of leads 30 and 31 extend from one end of the resistance element 18 and extend through respective passageways in an insulator 32 which is positioned in a passageway 33 which extends between the hole 22 and the recess 26. As may be seen best in FIG. 3, the leads 30 and 31 are mechanically and electrically connected to a pair of leads 34 and 35 in the sheathed cable 14 by welding, soldering or brazing. The leads 34 and 35 are insulated from one another and from the metal sheath 24 by a mineral oxide such as aluminum oxide or by any other suitable insulating material 36 which fills the sheath 24. While the illustrated embodiments of the invention include two lead wires 34 and 35, it must be understood that additional lead wires may extend through the sheath for connecting the leads 30 and 31 to remotely located circuitry. For example, one or more additional leads may be used in compensation networks for eliminating the effects of temperature related resistance changes in the lead wire system.

Figure 3:
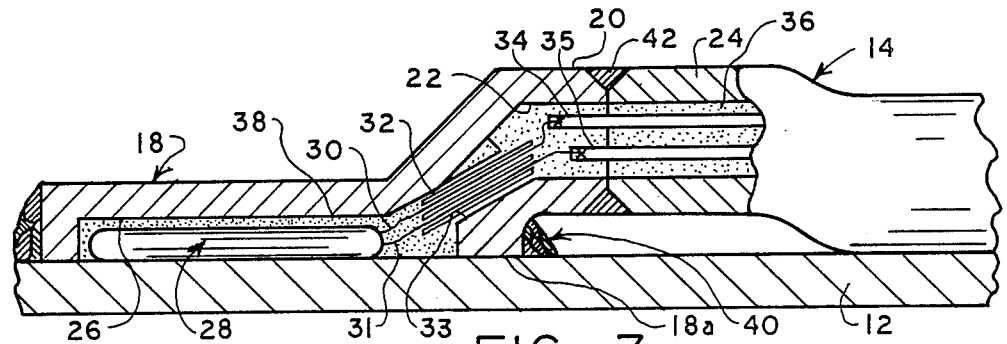
FIG. 3 is a cross-sectional view taken along the line 3—3 of FIG. 2 assuming the entire device to be shown therein.
Figure 4:
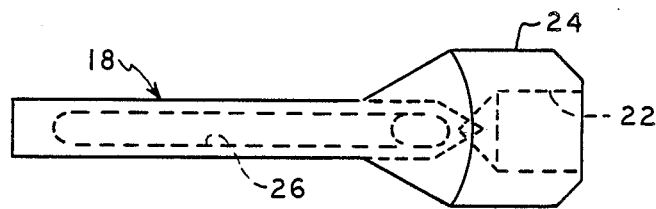
FIG. 4 is a top view of the body element of the RTD assembly of FIG. 1.

The resistance element device 28 is cemented in place within the recess 26 by a suitable high temperature cement 38 such, for example, as spark plug cement which also functions to secure the insulator 32 in place within the body 18. The cylindrical section 20 of the body 18 is spaced from the plane defined by the bottom surface 18a of the body 18 by a sufficient distance to permit the provision of a continuous circumferential weld 40 between the body 18 and the surface of the exchanger 12. The weld 40 extends completely around the entire junction of the body 18 and the exchanger 12 so as to hermetically seal the element 28 from the ambient gases which would otherwise reduce its useful life and affect the accuracy of the temperature reading. As best shown in FIG. 3, the distal end of the sheath 24 is abutted against the corresponding end of the cylindrical section 20 of the body 18 and is welded thereto as shown at 42 to provide an hermetic seal between the sheath 24 and the cylindrical section 20.

The weld 40 is effected by means of a welding operation which includes a plurality of weld passes beginning with a root weld pass 41 and a plurality of successive secondary weld passes including a final weld pass to provide the hermetic seal which seals the RTD device 28 from the ambient gasses.

Figure 2:
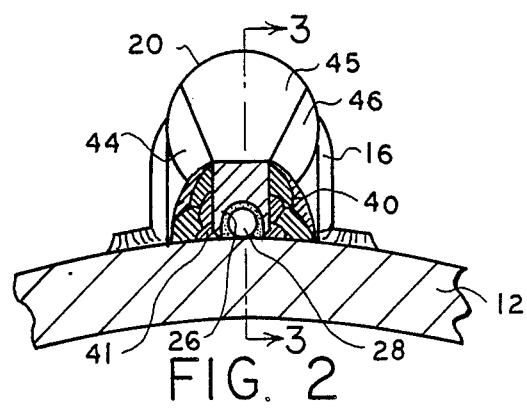
FIG. 2 is a cross-sectional view taken along the line 2—2 of FIG. 1.

As may be seen in FIGS. 2 and 3, the bottom surface of the resistance element 28 is in the plane of the bottom surface 18a of the body 18 so that when the assembly 10 is welded to the exchanger 12 the element 28 is in direct contact with the external surface of the heat exchanger 12.

Not only is the body member 18 exposed directly to the combustion gases, but also the sheath cable 14 is also exposed directly to the combustion gases. Therefore, the operating temperature of the sheath is higher than that of the exchanger surface since the exchanger surface is continuously giving up heat to the lower temperature fluid which passes along the opposite surface of the exchanger. It is, therefore, particularly important that the heat from the sheath not be conducted directly to the resistance element 28 to influence the temperature being measured by the RTD device 28.

In order to thermally isolate the element 28 from the sheath 24 the elongate section of the body 18 in which the element 28 is mounted is connected to the cylindrical end portion 20 by an intermediate, generally tapered or necked down portion comprising a plurality of flat surfaces 44, 45 and 46 which reduces the cross-sectional dimension of the body 18 to provide a thermal dam between the sheath 24 and the RTD device 28. Consequently, the RTD device measures the temperature of the surface of the exchanger 12 which it directly contacts and that temperature is not altered by the higher temperature of the sheath 24. It should be noted that the minimum wall thickness of the body 18 is no less than the wall thickness of the sheath 24 to avoid breakage of the body 18 at the necked down region.

Figure 6:
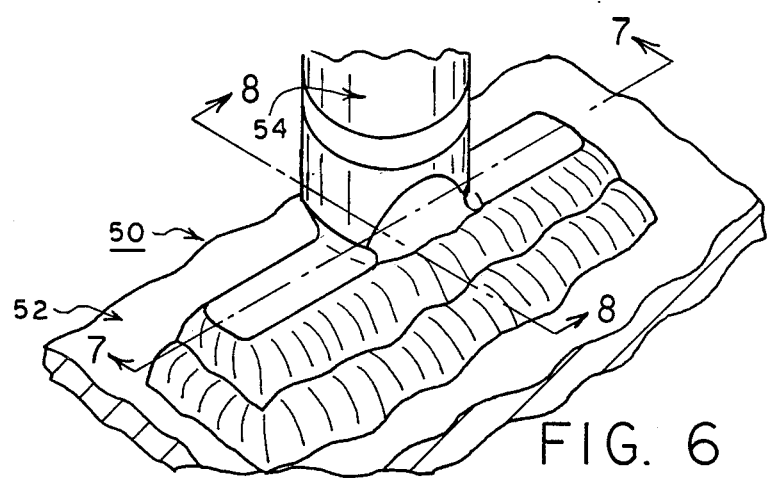
FIG. 6 is a perspective view of another RTD assembly embodying the present invention.

Referring now FIGS. 6, 7 and 8, there is shown a resistance temperature detector assembly 50 which finds use in those applications where it is desired that the sheath cable 54 extend perpendicularly to the surface of the heat exchanger 52 to which it is to be connected. As shown, the assembly 50 is welded to the external surface of a heat exchanger 52 in the form of a metal tube to the outer surface of which hot combustion gases are applied and along the inner surface of which a fluid such as a liquid or gas is passed so as to be heated by the hot inner surface of the exchanger 12. The assembly 50 is welded directly to the external surface of the exchanger 52, and a sheathed electric cable 54 is mechanically and electrically connected to the resistance temperature detector assembly 50 as best shown in FIGS. 7 and 8.

In this embodiment of the invention, the assembly 50 comprises a metal body member 56 having an elongate section 58 and a centrally disposed upstanding tubular portion 60. An elongate recess 62 is provided in the bottom surface of the body section 58 to receive an elongate resistance element 64 of the RTD. The resistance element 64 is cemented in place in the recess 62 by means of a high temperature ceramic cement, and the leads which extend from the respective ends of the element 64 extend through spaced passages in an insulator 66 mounted in an opening 68 in the body 58. The leads are respectively connected to a pair of insulated leads 70 and 72 in the sheathed cable 54. The sheathed cable 54 further includes an outer metal sheath 73 and a mineral oxide filler 74 which insulate the conductors 70 and 72 from one another and from the sheath 73. The lower end of the sheath 73 is welded to the upper end of the tubular connector section 50 as shown at 76.

Referring to FIGS. 9 and 10, there is shown a resistance temperature detector assembly 80 which is welded to the external surface of a heat exchanger 82 to the upper surface of which hot combustion gases are applied and along the inner surface of which a fluid such as a liquid or gas is passed to be heated by the heat exchanger 82. The assembly 80 is welded to the heat exchanger 82 in the same manner in which the assembly 10 is welded to the heat exchanger 12 in the embodiment shown in FIG. 1.

The RTD assembly 80 includes a body 84 provided with an elongate recess 86 in which an elongate resistance element 88 is mounted and secured in place by a high temperature ceramic cement or other suitable high temperature cement. The leads from the element 88 extend upwardly through an apertured insulator 90 which is mounted in an opening 92 located between a tubular connector section 94 at the top and the elongate section of the body. It may be seen that the body is necked down at 96 between the connector portion 94 and the elongate body section to provide the thermal dam necessary to reduce heat transfer from the sheath of a sheathed cable 98 to the resistance element 88.

Figure 12:
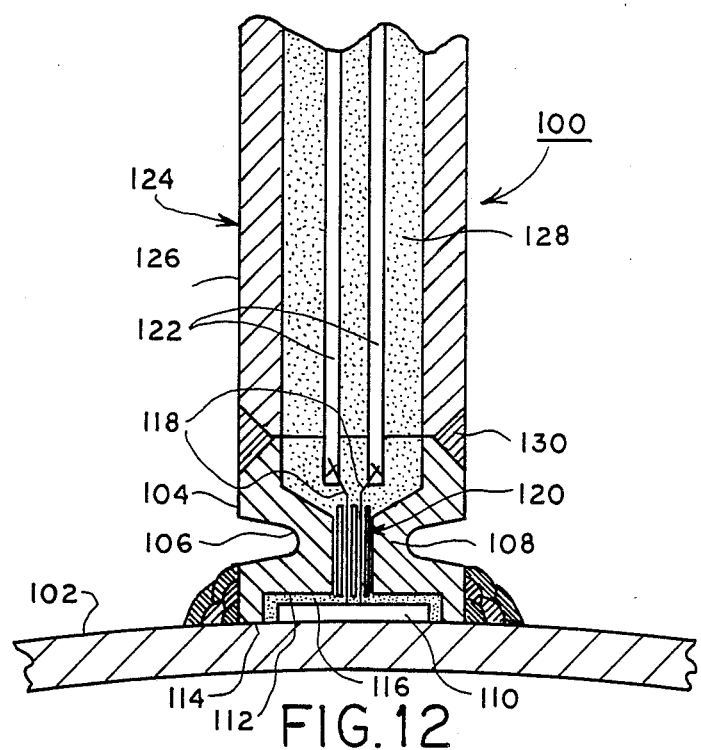
FIG. 12 is a longitudinal cross-sectional view taken along the line 12—12 of FIG. 11.
Figure 11:
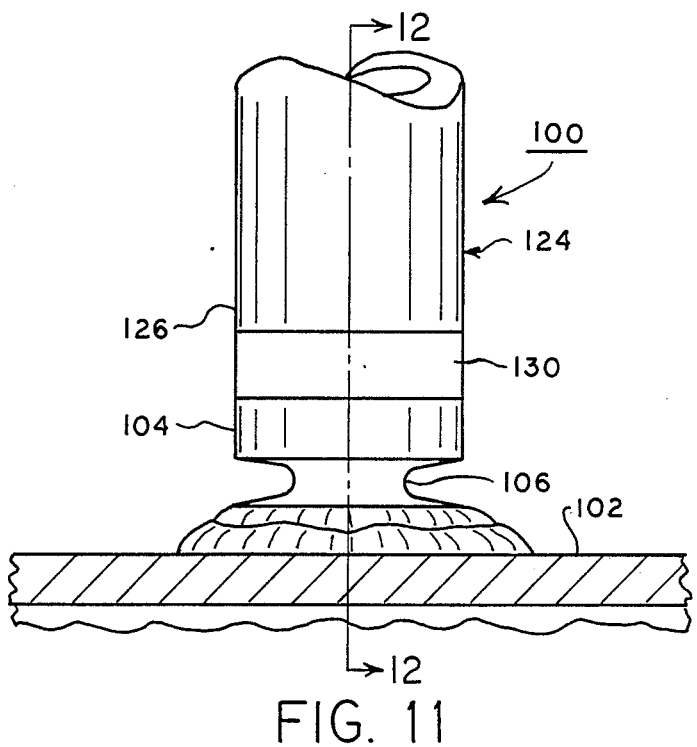
FIG. 11 is a perspective view of yet another embodiment of the invention.

Referring to FIGS. 11 and 12, there is shown a resistance temperature detector assembly 100 which is welded to the external surface of a heat exchanger 102. Hot combustion gasses are applied to the upper surface of the heat exchanger as viewed in FIG. 12, and a liquid or gas to be heated is passed along the lower surface. It may be seen that the assembly 100 is welded to the upper surface of the heat exchanger by a continuous weld which completely encircles the base of the assembly 100 as in the embodiment shown in FIG. 1.

The assembly 100 includes a generally cylindrical, tubular body 104 having a peripheral annular groove 106 to provide an intermediate annular wall section 108. A resistance element 110 is in the shape of a flat, circular disc and is mounted in a cylindrical recess 112 in the bottom of the body 104 with the bottom surface of the element 110 being coplanar with the bottom annular surface 114 of the body 104. The element 110 is secured in place in the body 104 by a suitable high temperature cement 116.

A pair of leads 118 from the element 110 extend through a pair of spaced passageways in an insulator 120 which is mounted on the small diameter intermediate section of the bore in the body 104. The leads 118 are respectively welded to a pair of leads 122 of a sheathed cable 124 which further includes an external metal sheath 126 and a mineral oxide filler 128 which insulates the leads 122 from one another and from the sheath 126. The lower end of the sheath 126 is welded to the upper end of the body 104 as shown at 130.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. A temperature sensing device for using in monitoring the temperature of a surface, comprising in combination
   a solid metal body having a recess located in a portion thereof and opening onto one surface thereof,
   a resistance element mounted in said recess,
   heat insulating means interposed between said body and said resistance element,
   said body having a hole extending from one end of said body into communication with said recess
   a first plurality of conductive leads extending from said resistance element into said hole,
   a sheathed cable having a second plurality of conductive leads extending through a metal sheath,
   said sheath being welded to said one end of said body over said hole,
   the conductive leads of said first and second pluralities being respectively connected together, and
   means insulating said first plurality of conductive leads from one another and from said body,
   said body being substantially smaller in size than said sheathed cable and having a heat transfer inhibiting section disposed between said one end and said portion thereof in which said recess is located thereby to inhibit the transfer of heat from said sheathed cable to said portion of said body in which said recess is located.

2. A temperature sensing device according to claim 1 wherein
   said heat transfer inhibiting section has a cross-sectional area which is less than the cross-sectional area of said body at said one end.

3. A temperature sensing device according to claim 2 wherein
   said resistance element is elongate and is insertable into said recess through said hole.

4. A method of measuring the temperature at a surface of a member, comprising the steps of
   providing a temperature sensing device comprising in combination a solid metal body having a recess located in a portion thereof and opening onto one surface thereof, a resistance element mounted in said recess, heat insulating means interposed between said body and said resistance element, said body having a hole extending from one end of said body into communication with said recess, a first plurality of conductive leads extending from said resistance element into said hole, a sheathed cable having a second plurality of conductive leads extending through a metal sheath, said sheath being welded to said one end of said body over said hole, the conductive leads of said first and second pluralities being respectively connected together, and means insulating said first plurality of conductive leads from one another and from said body, said body being substantially smaller in size than said sheathed cable and having a heat transfer inhibiting section disposed between said one end and said portion thereof in which said recess is located thereby to inhibit the transfer of heat from said sheathed cable to said portion of said body in which said recess is located,
   positioning said one surface of said body and an external surface of said resistance element in contact with said surface of said member, and
   providing a continuous weld completely surrounding said recess between said body and said surface of a member.

* * * * *